United States Patent
Cullen et al.

(10) Patent No.: US 6,738,706 B2
(45) Date of Patent: May 18, 2004

(54) METHOD FOR ESTIMATING ENGINE PARAMETERS

(75) Inventors: Michael John Cullen, Northville, MI (US); Mrdjan J. Jankovic, Birmingham, MI (US); Stephen Lee Cooper, Dearborn, MI (US); Stephen William Magner, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 94 days.

(21) Appl. No.: 10/064,183

(22) Filed: Jun. 19, 2002

(65) Prior Publication Data

US 2003/0236610 A1 Dec. 25, 2003

(51) Int. Cl.[7] ............................. B60T 7/12; G06F 7/00
(52) U.S. Cl. ................. 701/103; 701/115; 123/90.15
(58) Field of Search ............................. 701/103, 115, 701/114, 104, 105; 123/90.15, 90.16, 90.17

(56) References Cited

U.S. PATENT DOCUMENTS

| | | | | |
|---|---|---|---|---|
| 4,779,597 A | * | 10/1988 | Takaku et al. | ............... 123/479 |
| 5,284,116 A | * | 2/1994 | Richeson, Jr. | ........... 123/406.2 |
| 5,771,686 A | * | 6/1998 | Pischinger et al. | ............ 60/274 |
| 5,954,781 A | * | 9/1999 | Slepian et al. | ................. 701/96 |
| 6,041,591 A | * | 3/2000 | Kaneko et al. | ................ 60/274 |
| 6,073,073 A | * | 6/2000 | Kitamura et al. | ............ 701/103 |
| 6,367,447 B1 | * | 4/2002 | Palansky et al. | ............. 123/361 |
| 6,393,357 B1 | * | 5/2002 | Holmes et al. | ............. 701/115 |
| 6,609,058 B1 | * | 8/2003 | Russell et al. | .............. 701/104 |

\* cited by examiner

Primary Examiner—Willis R. Wolfe
Assistant Examiner—Johnny H. Hoang
(74) Attorney, Agent, or Firm—Allan J. Lippa (57) ABSTRACT

A method for estimating operating parameters of an internal combustion engine uses data stored as a function of intake and exhaust valve timing. In particular, the parameters are stored at a default operating point, several stability limited points, a high performance point, and an intermediate point. An inverse distance interpolation algorithm is used to calculated current slope and offset values at the current operating conditions. From these calculated slope and offset values, engine operating parameters, such as manifold pressure and cylinder air amount, are estimated.

13 Claims, 6 Drawing Sheets

METHOD FOR ESTIMATING ENGINE PARAMETERS

BACKGROUND OF INVENTION

1. Field of the Invention

The field of the present invention relates to estimating engine operating parameters of an internal combustion engine of a vehicle. More particularly, the present invention relates to a method for estimating manifold pressure of an engine having numerous actuators that affect engine breathing, such as a charge motion control valve, valve timing actuators and valve lift actuators.

2. Background of the Invention

Various methods can be used to estimate operating parameters of a vehicle's internal combustion engine. One particular parameter that is estimated using information from vehicle sensors is manifold pressure. An example approach is described in U.S. Pat. No. 5,331,936.

The inventors herein have recognized a disadvantage with this and other prior art systems. As new engine actuators are continually added, the complexity in estimating manifold pressure (and other operating parameters) grows exponentially. For example, in engines that have both adjustable intake and exhaust valve timing, the complexity of estimating manifold pressure can be overbearing, especially during dynamic situations. In other words, manifold pressure is dependent on intake cam opening time, intake cam closing time, exhaust valve opening time, exhaust valve closing time, engine speed, mass air flow, barometric pressure, engine temperatures, etc. To map the engine at every possible combination becomes a difficult and expensive task.

SUMMARY OF INVENTION

The above disadvantages are overcome by a method for controlling an engine of a vehicle, the engine having a variable valve actuator. The method comprises:

- storing manifold pressure related parameters [slope and offset parameters] as a function of intake and exhaust valve timing at a subset of engine operating conditions, said subset including at least a default operating point, and a predetermined set of normal conditions, and an intermediate point away from normal operating conditions;
- calculating current manifold pressure related parameters based on actual engine speed and actual intake and exhaust valve timings using said stored manifold pressure related parameters;
- estimating an engine state based on said current manifold pressure related parameters, and based on at least one engine operating condition;
- controlling the engine based on said estimated engine state.

By storing data as a function of intake and exhaust valve timing, with the data indexed by a default operating point, a predetermined set of normal conditions, and an intermediate point, it is possible to accurately cover real world operating conditions of the engine. In other words, data storage is a fraction of that used with prior art approaches, which also results in algorithm simplification. As such, it is possible to accommodate a great number of engine actuators that affect engine state estimation without continually expanding data storage and algorithm calculations at an exponential rate.

Further, by providing an accurate and efficient method to estimate manifold pressure, it is possible to develop advanced engine technologies including variable intake and exhaust timing, while still eliminating the cost of a manifold pressure sensor.

DETAILED DESCRIPTION

Figure 1:
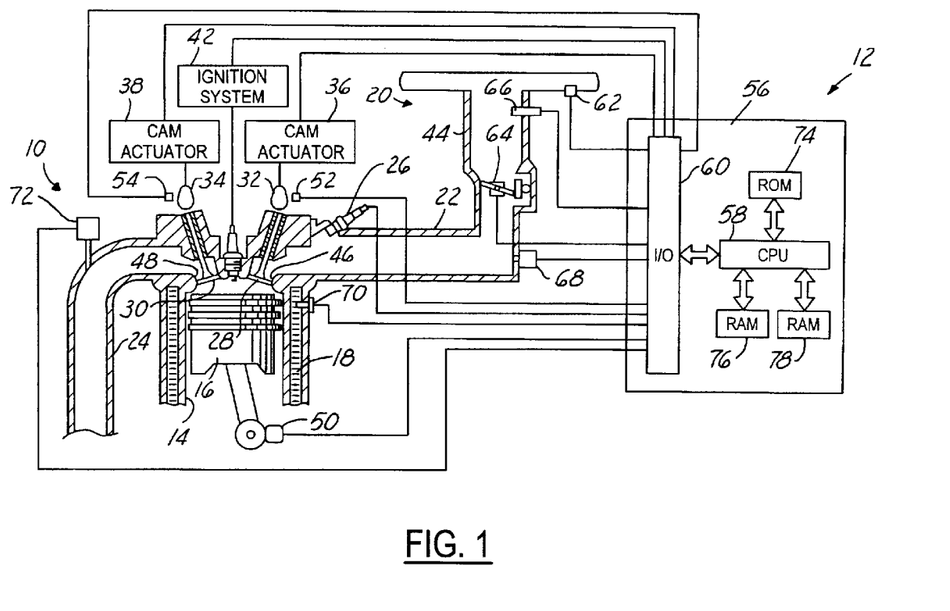
FIG. 1 is a schematic diagram illustrating an internal combustion engine incorporating a system for determining a parameter of the engine in accordance with the present invention.

Referring now to the drawings wherein like reference numerals are used to identify identical components in the various views, FIG. 1 illustrates an internal combustion engine 10. FIG. 1 also illustrates a system 12 in accordance with the present invention for controlling engine 10.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 14 and may also include a plurality of pistons 16, coolant passages 18, a throttle 20, an intake manifold 22, an exhaust manifold 24, fuel injectors 26, intake valves 28, exhaust valves 30, camshafts 32, 34, camshaft actuators 36, 38, spark plugs 40, and an ignition system 42.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Throttle 20 controls the amount of air delivered to intake manifold 22 and cylinders 14. Throttle 20 is conventional in the art and includes a throttle plate or valve (not shown) disposed within a throttle body 44. The position of the throttle plate may be responsive to the vehicle operator's actuation of an accelerator pedal or may be electronically controlled.

Intake manifold 22 provides a structure for delivering charged air to cylinders 14 from throttle 20. Manifold 22 is conventional in the art. An intake port 46 is disposed between each cylinder 14 and manifold 22.

Exhaust manifold 24 is provided to vent exhaust gases from cylinders 14 after each combustion event. Manifold 24 is also conventional in the art and may deliver exhaust gases to a catalytic converter (not shown). An exhaust port 48 is disposed between each cylinder 14 and manifold 24.

Fuel injectors 26 are provided to deliver fuel in controlled amounts to cylinders 14 and are conventional in the art. Although only one fuel injector 26 is shown in the illustrated embodiment, it will again be understood that engine 10 will include additional fuel injectors 26 for delivering fuel to other cylinders 14 in engine 10.

Intake valves 28 open and close each intake port 46 to control the delivery of air, from manifold 22, and fuel, from fuel injectors 28, to the respective cylinders 14.

Exhaust valves 30 open and close each exhaust port 48 to control the venting of exhaust gases from the respective cylinders 14.

Camshafts 32, 34 control the movement of valves 28, 30, respectively. Camshafts 32, 34 may comprise dual independent (di) variable position intake and exhaust valve camshafts capable of independently altering the positional relationship of various cams on camshafts 32, 34, relative to the engine crankshaft. One or both of camshafts 32, 34 may include a pulse wheel (not shown) disposed at one end of the camshaft 32, 34. The pulse wheel may include a plurality of teeth for use in measuring camshaft position to aid in cylinder identification and cam timing.

Actuators 36, 38 control the angular position of camshafts 32, 34 relative to the engine crankshaft. Actuators 36, 38 are hydraulically actuated. However, electric valve actuators may also be used.

Spark plugs 40 are provided to ignite the air/fuel mixture in cylinders 14. Spark plugs 40 are also conventional in the art. Although only one spark plug is shown in the illustrated embodiment, it should be understood that each cylinder 14 will include at least one spark plug 40.

Ignition system 42 delivers electrical current to spark plugs 40. System 42 is conventional in the art may comprise a solid-state ignition system (i.e., a distributor-less system).

System 12 is provided to determine control valves for engine 10. System 12 may form part of a larger system for controlling various components of engine 10 including the throttle plate (not shown), fuel injectors 26, camshaft actuators 36, 38, and ignition system 42. System 12 may include a profile ignition pickup (PIP) sensor 50 and cylinder identification (CID) sensors 52, 54 (only one of which is shown in the illustrated embodiment). System also includes an electronic control unit (ECU) 56.

PIP sensor 50 is provided to indicate the position of the engine crankshaft (not shown) and is conventional in the art. Sensor 50 generates a signal that is indicative of the speed of engine 10 and is input to ECU 56.

CID sensors 52, 54 are provided to identify the cylinder 14 housing the current or next combustion event and to aid in intake valve and exhaust valve timing and spark timing. CID sensors 52, 54 are conventional in the art and may detect the rotational position of camshafts 32, 34 responsive to rotation of pulse wheels (not shown) attached to one end of the camshafts 32, 34 as described and illustrated in commonly assigned U.S. Pat. No. 5,245,968, the entire disclosure of which is incorporated herein by reference. Sensors 52, 54 generate signals that are indicative of the rotational position of the camshafts 32, 34 and are input to ECU 56.

ECU 56 is provided to control engine 10. ECU 56 may comprise a programmable microprocessor or microcontroller or may comprise an application specific integrated circuit (ASIC). ECU 56 may include a central processing unit (CPU) 58 and an input/output (I/O) interface 60. Through interface 60, ECU 56 may receive a plurality of input signals including signals generated by sensors 50, 52, 54 and other conventional sensors, including but not limited to, an air temperature sensor 62, a throttle position sensor 64, a mass air flow (MAF) sensor 66, a manifold absolute pressure (MAP) sensor 68, an engine coolant temperature sensor 70, and a Heated Exhaust Gas Oxygen (HEGO) sensor 72. Also through interface 60, ECU 56 may generate a plurality of output signals including one or more signals used to control fuel injectors 26, camshaft actuators 36, 38, and ignition system 42. ECU 56 may also include one or more memories including, for example, Read Only Memory (ROM) 74, Random Access Memory (RAM) 76, and a Keep Alive Memory (KAM) 78 to retain information when the ignition key is turned off.

Referring now to FIG. 2, a method for estimating a variable of engine 10 will be described. The method or algorithm may be implemented by system 12 wherein ECU 56 is configured to perform one or more steps of the method by programming instruction or code (i.e., software). The instructions may be encoded on a computer storage medium, such as a conventional diskette or CD-ROM, and may be copied into memory 74 of ECU 56 using conventional computing devices and methods.

The present application expressly incorporates by reference the entire contents of:

U.S. Ser. No. 09/739,088, filed Dec. 16, 2000; entitled "IGNITION TIMING FOR ENGINE WITH DUAL INDEPENDENT CAMSHAFTS";

U.S. Ser. No. 10/045,384, filed Nov. 9, 2001, entitled "A ROBUST INTERPOLATION METHOD FOR IMPROVED AUTOMOTIVE ENGINE CONTROL DURING TRANSIENT OPERATION"; and U.S. Ser. No. 09/737,383, filed Dec. 15, 2000, entitled "TORQUE BASED CAM TIMING CONTROL METHOD AND SYSTEM".

These applications describe a scheduling method for variable cam timing (VCT) and ignition timing (spark) control parameters.

Using a dual independent (di) VCT engine as an example, one can summarize a control method for cam timing and ignition timing control as follows:

Schedule intake and exhaust cam timing (denoted herein as IVO and EVC) on engine speed and desired load for best fuel economy/emissions. These cam timing values are referred to as "stability limited" (SL).

For each engine speed, find the maximum torque ("optimal performance" (OP)) intake and exhaust camtiming pair.

Use barometric pressure (BP) to interpolate between the OP and SL cam timing when operating at altitude to make sure the engine operates at OP cam timing as the desired percent load (or percent torque) approaches one.

At any engine speed and load breakpoint pair, determine and store in the memory the values of (MBT and/or borderline) spark timing only at IVO-EVC pairs where the engine may operate in steady state under certain conditions. These IVO-EVC pairs typically include the OP and SL points and an additional point where the actuators are locked when de-energized (called the default (D) point). To improve transient accuracy in the IVO and EVC directions, one may add one or more intermediate (IM) points.

In real time, determine current speed and load. Using a bi-linear interpolation method in engine speed and (actual) load obtain intake cam, exhaust cam, and spark timings that correspond to OP, SL, D (and IM if applicable) operating points.

Compute the square (Euclidean) distances between the measured cam timing and OP, SL, D, and IM pairs.

The actual spark timing is then obtained by inverse distance interpolation between spark timings at OP, SL, D, and IM operating points. Inverse-distance interpolation provides that, in steady state, at the speed/load breakpoints, the spark timing interpolation error is substantially zero. Because the speed/load breakpoints are relatively densely distributed, interpolation accuracy in those directions is as good as in conventional strategies.

The present invention provides a method to, among other things, infer manifold air pressure (MAP) by using an inverse-distance interpolation for the slope and offset volumetric efficiency coefficients. These coefficients are then used to compute inferred MAP. The inventors herein have noted a potential problem that can appear when the same coefficients are used for air-charge estimation. This leads to an unintentional feedback loop because, for the slope and offset interpolation, the SL cam timing is looked up against the load, which in turn depends on air-charge. That is, the loop air-charge→load→SL cam timing (for slope and offset interpolation)→interpolated slope and offset→air-charge may be created. This unintended feedback loop may cause degradation in the air-charge estimate and, subsequently, in other variables computed from the air-charge, including inferred MAP. Such an approach is referred to as the "load-dependent algorithm".

Another approach can be used that avoids such a loop. In particular, since the slope and offset coefficients can be made independent from load (but based on engine speed, intake and exhaust cam timings). Note that there is also a dependence on air and engine temperatures and barometric pressure. This dependence can handled by correction factors that can be applied to an inferred manifold pressure estimate calculated according to the present invention.

In particular, the present invention includes a method to determine volumetric efficiency (vol. eff.) coefficients that use the same amount of information needed by the load-dependent algorithm described above. One exemplary method according to the present invention is described in the routine of FIG. 2.

Figure 2A:
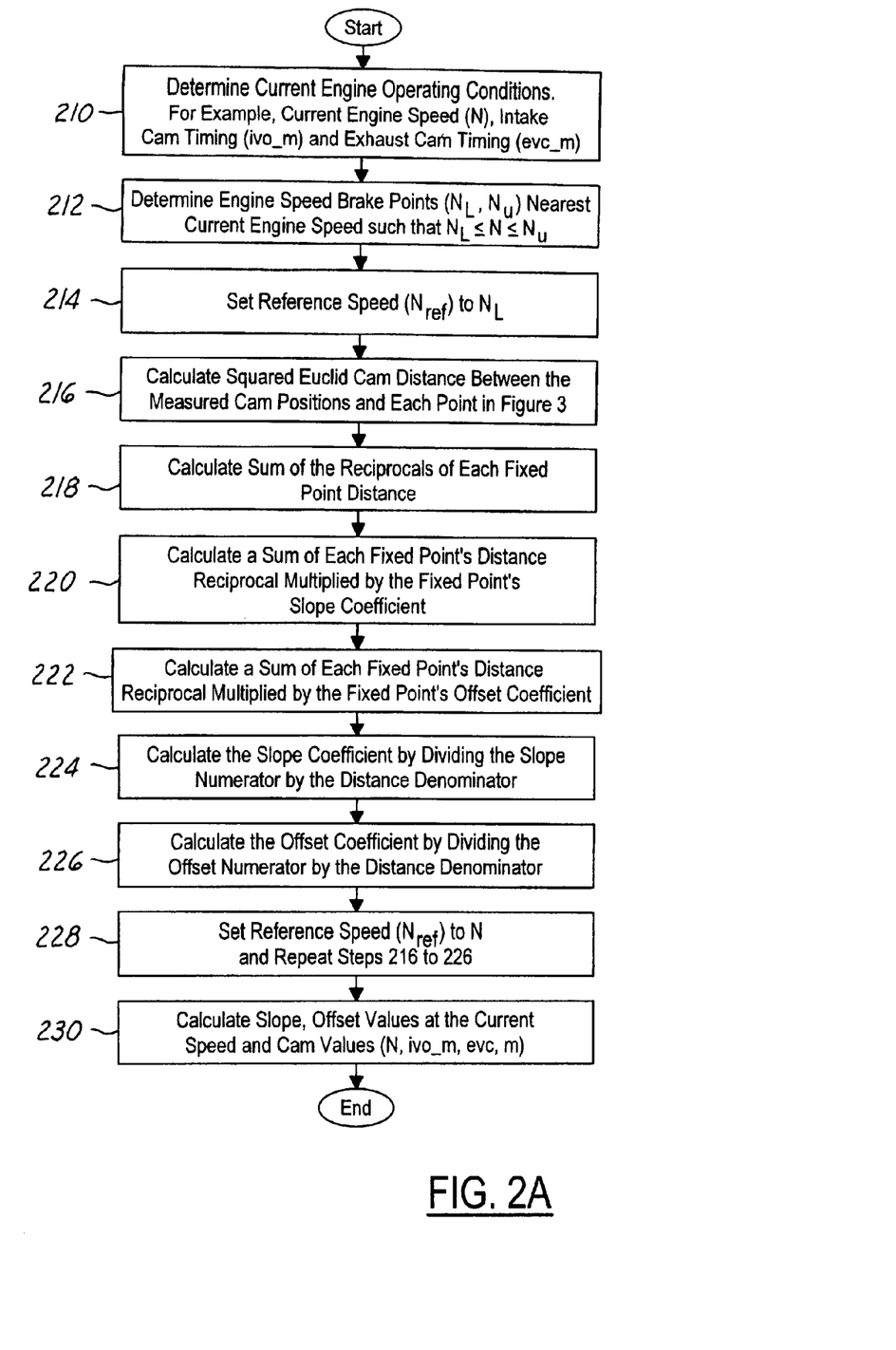
FIG. 2 is a flow chart diagram illustrating a method for determining parameters of an engine in accordance with the present invention.

Referring now specifically to FIG. 2A, a routine is described for estimating slope and offset values according to one embodiment of the present invention.

First, in step 210, the routine determines current values of engine speed N, intake cam timing ivo_m, and exhaust cam timing evc_m. Then, in step 212, the routine determines two engine speed breakpoints $N_l$ and $N_u$ nearest to N such that $N_l \leq N < N_u$. Next, in step 214, the routine set a reference engine speed (Nref) equal to $N_l$ to compute slope and offset as a function of $N_l$, ivo_m, and evc_m.

Next, in step 216, the routine calculates the squared Euclidean distance between the measured cam positions and each of the M fixed-cam positions (Table 1, described below herein, shows the case when M=9) for the intake and exhaust cams (at $N=N_l$). In particular, the following equations (a1, a2, . . . aM) can be used.

$$\text{fixpnt\_dist}(1) = \qquad \text{Eqn. a1}$$
$$(\text{ivo\_m} - \text{ivo\_des}(1))^2 + (\text{evc\_m} - \text{evc\_des}(1))^2 + \text{eps}$$

$$\text{fixpnt\_dist}(2) = \qquad \text{Eqn. a2}$$
$$(\text{ivo\_m} - \text{ivo\_des}(2))^2 + (\text{evc\_m} - \text{evc\_des}(2))^2 + \text{eps}$$

$$\vdots$$

$$\text{fixpnt\_dist}(M) = \qquad \text{Eqn. aM}$$
$$(\text{ivo\_m} - \text{ivo\_des}(M))^2 + (\text{evc\_m} - \text{evc\_des}(M))^2 + \text{eps}$$

where:

fixpnt_dist is the sum of the squared distances between measured and fixed-point cam positions.

ivo_m is the measured intake cam shaft position relative to the crankshaft.

evc_m is the measured exhaust cam shaft position relative to the crankshaft.

ivo_des(i) is a vector of the intake cam positions at a fixed engine mapping point, indexed by the variable i.

evc_des(i) is a vector of the exhaust cam positions at a fixed engine mapping point, indexed by the variable i.

eps is a term used to avoid a divide-by-zero error in the algorithm once the measured cam position reaches a fixed point in steady state operation. The eps term should be kept small, for example, 1% or less of the range of the cam shaft movements.

Note that this step is well suited to a looping construct in which the looping construct produces an array of values. For example, see the block diagram of FIGS. 4A and B, described below herein.

Continuing with FIG. 2A, in step 218 the routine calculates a sum of the reciprocals of each fixed-point distance (which will be used as a denominator of a quotient equal to the slope coefficient) according to equation 1b.

$$\text{dist\_den} = \frac{1}{\text{fixpnt\_dist}(1)} + \frac{1}{\text{fixpnt\_dist}(2)} + \cdots + \frac{1}{\text{fixpnt\_dist}(M)} \qquad \text{Eqn. 1b}$$

Again, this step is well suited to a looping construct in which the looping construct results in a summed value.

Next, in step 220, the routine calculates a sum of each fixed point's distance reciprocal multiplied by the fixed point's slope coefficient according to Eqn. 1c.

$$\text{slope\_num} = \frac{1}{\text{fixpnt\_dist}(1)} \text{slope}(1) + \qquad \text{Eqn. 1c}$$
$$\frac{1}{\text{fixpnt\_dist}(2)} \text{slope}(2) + \cdots + \frac{1}{\text{fixpnt\_dist}(M)} \text{slope}(M)$$

where the values of the slope variable are indexed in coordination with the corresponding ivo_des, evc_des pair as shown in Table 1.

Again, this step is well suited to a looping construct in which the looping construct results in a summed value.

Then, in step 222, the routine calculates a sum of each fixed point's distance reciprocal multiplied by the fixed point's offset coefficient according to Eqn. 1d.

$$\text{offset\_num} = \frac{1}{\text{fixpnt\_dist}(1)} \text{offset}(1) + \qquad \text{Eqn. 1d}$$

-continued $$\frac{1}{\text{fixpnt\_dist}(2)}\text{offset}(2) + \cdots + \frac{1}{\text{fixpnt\_dist}(M)}\text{offset}(M)$$

where, similarly, the values of the offset variable are indexed in coordination with the corresponding ivo_des, evc_des pair as shown in Table 1.

As above, this step is well suited to a looping construct.

Continuing with FIG. 2A, in step 224, the routine calculate the slope coefficient by dividing the slope numerator by the distance denominator as shown in Eqn. 1e.

$$\text{slope} = \frac{\text{slope\_num}}{\text{dist\_den}} \quad \text{Eqn. 1e}$$

Then, in step 226, the routine calculates the offset coefficient by dividing the offset numerator by the distance denominator as shown in Eqn. 1f.

$$\text{offset} = \frac{\text{offset\_num}}{\text{dist\_den}} \quad \text{Eqn. 1f}$$

Then, in step 228 the routine sets the reference engine speed equal to $N_u$, and repeat steps 216 through 226 to obtain slope and offset as a function of $N_u$, ivo_meas, and evc_meas. Then, in step 230, the routine obtains the slope and offset at N, ivo_meas, and evc_meas by interpolation according to equations 1g–2g:

$$\text{slope}(N, \text{ivo\_m, evc\_m}) = \frac{N_u - N}{N_u - N_1}\text{slope}(N_i, \text{ivo\_m, evc\_m}) + \quad \text{Eqn. 1g}$$
$$\frac{N - N_1}{N_u - N_1}\text{slope}(N_u, \text{ivo\_m, evc\_m})$$

$$\text{offset}(N, \text{ivo\_m, evc\_m}) = \frac{N_u - N}{N_u - N_1}\text{offset}(N_i, \text{ivo\_m, evc\_m}) + \quad \text{Eqn. 2g}$$
$$\frac{N - N_1}{N_u - N_1}\text{offset}(N_u, \text{ivo\_m, evc\_m})$$

Figure 3:
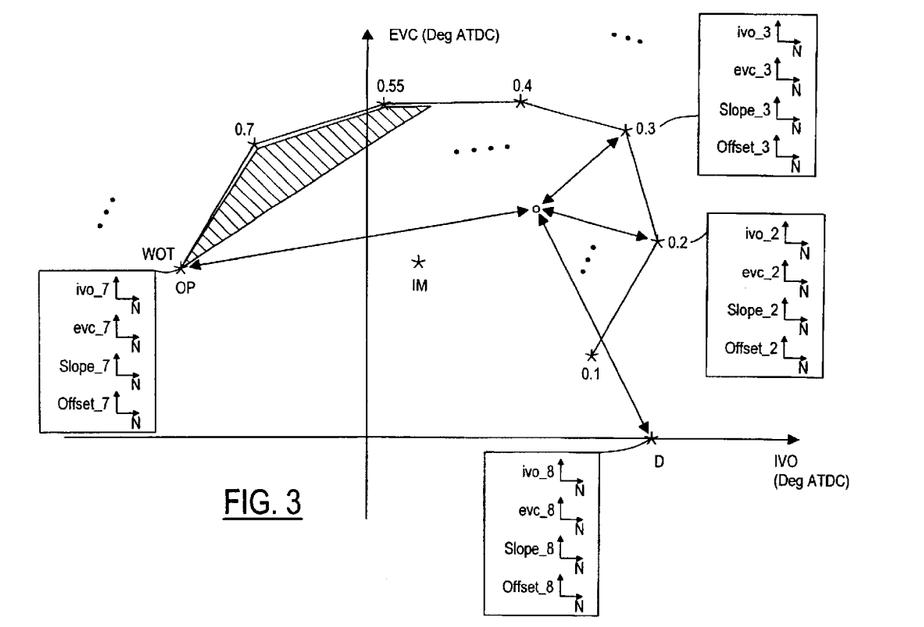
FIG. 3 is a graphical illustration of one embodiment of the method of FIG. 2.

The method of FIG. 2A can be more fully understood by considering FIG. 3. In FIG. 3, a graphical representation shows locations of scheduled intake and exhaust cam timing pairs (dash lines and the shaded region) in the intake valve opening-exhaust valve closing (IVO-EVC) plane, versus (desired) engine load at a given engine speed. The actuators are locked when in the default (D) position. When unlocked, the scheduled cam timing moves counterclockwise along the dash lines as the load increases. As described above, at altitude, the cam timing is obtained by BP-based interpolation between the SL and OP cam timing. The envelope of possible scheduled cam timing at altitude is given by the shaded region in FIG. 3.

In particular, FIG. 3 has dash lines that show engine operating points in the IVO-EVC plane at the nominal barometric pressure (at sea level), a given engine speed, and various loads. The shaded region gives an envelope of possible operating points at altitude. Each star represents a location of ivo-evc desired at a (des) load breakpoint indicated next to it.

As described above with regard to FIG. 2, slope and offset values are provided at each point versus engine speed. Then, slope and offset values are calculated at the current operating point, as illustrated by the open circle, using the inverse distance calculation.

As such, engine mapping can be considerably reduced since engine data across every engine operating conditions is not necessary. Rather, if desired, only the data at the stability limited, optimum power, default, and intermediate point can be used to estimate engine operating parameters at the current operating conditions.

While FIG. 3 represents data storage graphically, various other data storage forms can be used. In particular, according to the present invention, at each speed (N) and (desired) load break point, values of the slope and offset that correspond to the scheduled IVO-EVC pair at that speed and load are stored in the computer memory. In FIG. 3, the IVO-EVC pairs at which the slope and offset coefficient data are available in the memory for the given engine speed are shown by "*". Vol. eff. coefficients that correspond to one or more IM points (one is shown in FIG. 3) can be stored in the memory and used to improve transient performance, but are not necessarily intended for steady state operation. Table 1, below, shows the data available for computation of the slope and offset volumetric efficiency coefficients at one engine speed. For each (breakpoint) engine speed a similar table is available.

TABLE 1

Data (at fixed engine speed) available in the CPU memory to compute air-charge and inferred MAP.

| [t1] Index I | desig- nation | des_load | ivo_des | evc_des | slope | offset |
|---|---|---|---|---|---|---|
| 1 | SL | .1 | ivo_1 | evc_1 | slope_1 | offset_1 |
| 2 | SL | .2 | ivo_2 | evc_2 | slope_2 | offset_2 |
| 3 | SL | .3 | ivo_3 | evc_3 | slope_3 | offset_3 |
| 4 | SL | .4 | ivo_4 | evc_4 | slope_4 | offset_4 |
| 5 | SL | .55 | ivo_5 | evc_5 | slope_5 | offset_5 |
| 6 | SL | .7 | ivo_6 | evc_6 | slope_6 | offset_6 |
| 7 | OP | WOT | ivo_7 | evc_7 | slope_7 | offset_7 |
| 8 | D | N/A | ivo_8 | evc_8 | slope_8 | offset_8 |
| 9 | IM_1 | N/A | ivo_9 | evc_9 | slope_9 | offset_9 |

This table shows just one example embodiment of the present invention. For example, less stability limited (SL) points may be used. Further, the desired load values (des_load) could be selected to have a higher concentration at mid to low load, or equal spacing across the load operating region.

Note that, in this embodiment, the desired load entries are not used in the computation of the slope and offset coefficients. They are shown in the table because of their relationship to intake and exhaust cam pairs in the corresponding rows. That is, the ivo_des and evc_des are the scheduled cam timing values at the corresponding des_load, at the given engine speed. Having the slope and offset mapped and stored at the scheduled cam timing values assures that, when the engine operates in steady state, the actual cam timing is close to one of the scheduled ones, resulting in small interpolation error and subsequently small inferred MAP error.

In most engines there is an affine relationship between the cylinder air-charge and intake manifold pressure. This relationship is characterized by slope and offset volumetric efficiency coefficients that depend on engine speed and, in the case of VCT engines, on intake and exhaust valve timing. Therefore, to calculate inferred MAP, desired inferred MAP, and air-charge, the computated slope and offset coefficients can be used.

Figure 2B:
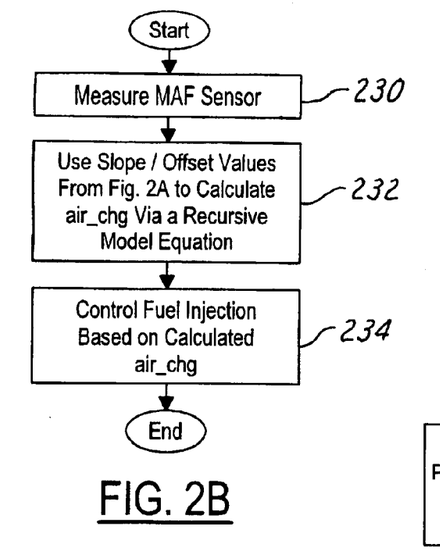
Figure 2C:
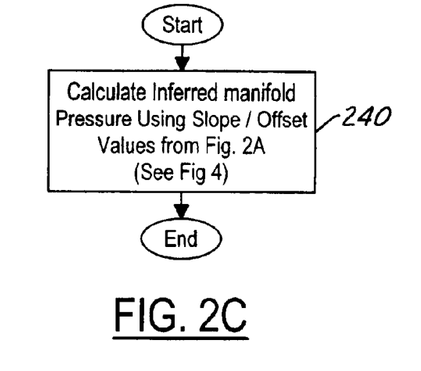
Figure 2D:
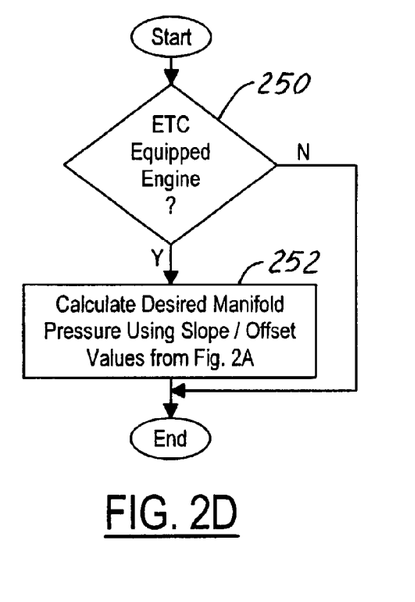

Referring now to FIGS. 2B–2D, routines for performing various other function using the calculated slope and offset at the current engine speed are described.

FIG. 2B describes a cylinder air-charge estimation routine. Engine control according to the present invention uses the mass airflow (MAF) measurement and volumetric efficiency (slope and offset coefficients) to recursively compute air-charge filling engine cylinders. Hence, after the current MAF measurement is acquired in step 230, the current values of the slope and offset coefficients are determined (as described with respect to FIG. 2) from the measurements of engine speed, and intake and exhaust cam timings. Once slope and offset coefficients are available a recursive step in air-charge estimation can be performed (step 232) according to Eqn. 1h:

$$air\_chg(k+1) = f(air\_chg(k), slope(k), offset(k), MAF(k)) \quad \text{Eqn. 1h}$$

where f(.) is a function that represents a recursive engine model, MAF(k) is a the measured value of the mass air flow, slope(k) and offset(k) are the current values of the slope and offset coefficients and air_chg(k) is the past (predicted) value of the air-charge estimate.

Referring now to FIG. 2C, a routine is described for estimating manifold pressure. In particular, in step 240, the routine calculates the inferred MAP using the slope and offset coefficients as described above and cylinder air charge from the engine strategy in Eqn. 1i.

$$inf\_map(k) = slope(k) air\_chg(k) + offset(k) \quad \text{Eqn. 1i}$$

The offset can be corrected by accounting for the ambient pressure and temperature conditions, and the slope can be corrected for internal temperature conditions that affect volumetric efficiency (not shown in the equation).

Referring now to FIG. 2D, a routine is described for determining desired manifold pressure. In particular, in ETC equipped vehicles desired (predicted) manifold air pressure can be used to determine a throttle position needed to satisfy driver's torque or acceleration demand. According to the present invention, it can be computed as shown in Eqn. 1j. In particular, the routine first determines whether the vehicle is equipped with ETC in step 250. If so, in step 252, the desired pressure is calculated according to Eqn. 1j.

$$inf\_des\_map(k) = des\_slope(k) des\_load \frac{\rho_{air} V_d}{\eta_{cyl}} + des\_offset(k) \quad \text{Eqn. 1j}$$

where:
des_load is the desired engine load determined from driver's acceleration demand, $\rho_{air}$ is the air density (at see level), $V_d$ is the engine displacement, $n_{cyl}$ is the number of cylinders, des_slope and des_offset are slope and offset volumetric efficiency coefficients computed by the routine of FIG. 2A from the engine speed N, and desired/scheduled (as opposed to measured) intake and exhaust cam timing values.

Figure 4A:
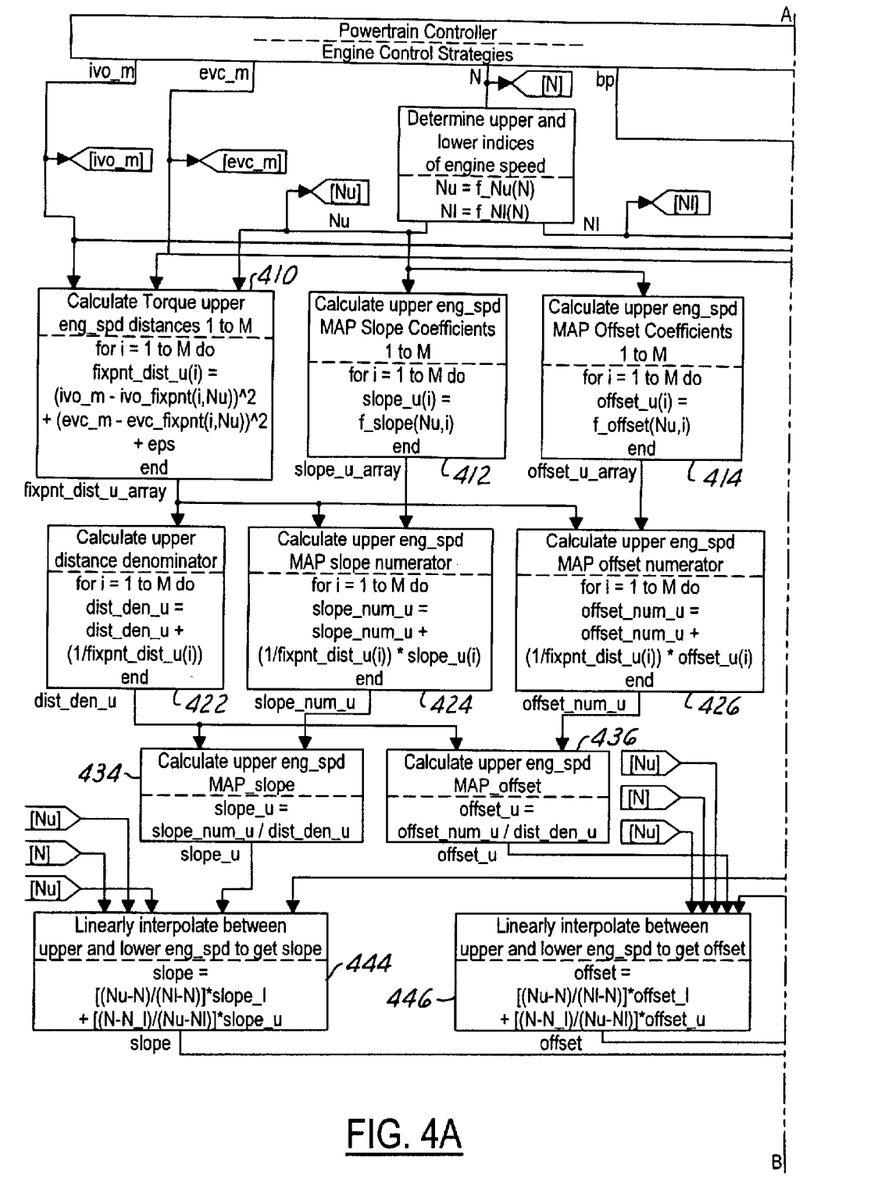
FIGS. 4A and 4B are a block diagram illustrating a method according to the present invention.
Figure 4B:
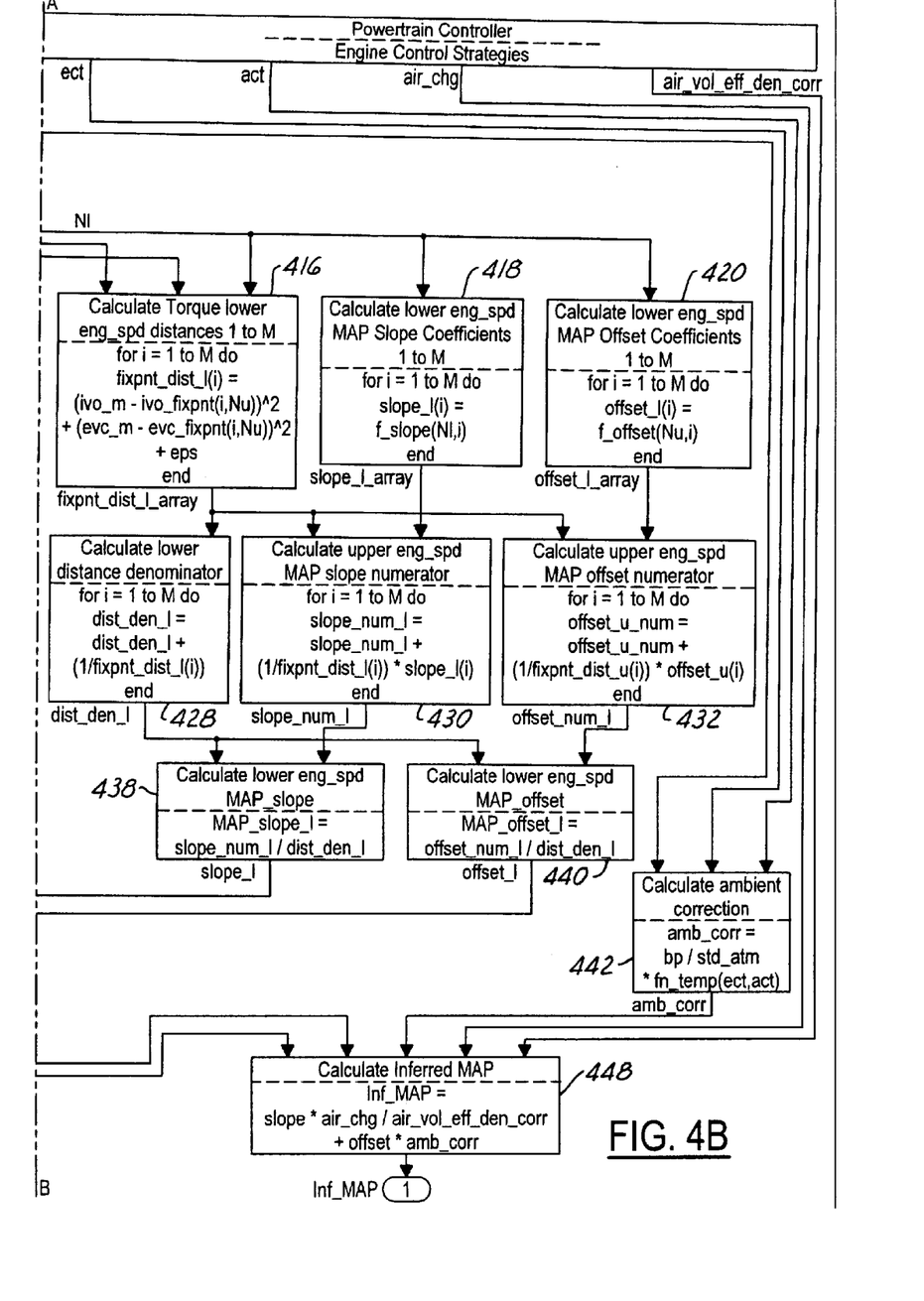

The block diagram of FIGS. 4A and 4B show how various measured parameters (such as, for example, intake valve opening timing, exhaust valve closing timing, engine speed, barometric pressure, engine coolant temperature (ECT), air charge temperature (ACT), air charge, and a volumetric efficiency correction) are used to calculate an estimated manifold pressure. In particular, based on the measured engine speed, block 408 determines upper and lower indices of the engine speed (Nu, Nl). Block 410 calculates distance values for the upper engine speed, while step 416 calculates distances for the lower engine speed. Similarly, block 412 calculates the upper engine speed slope coefficients, while block 414 calculates the upper engine speed offset coefficients. Block 418 calculates the lower engine speed slope coefficients, while block 420 calculates the lower engine speed offset coefficients.

Continuing with FIGS. 4A and 4B, an upper distance denominator is calculated in block 422, an upper slope numerator is calculated in step 424, and upper offset numerator is calculated in block 426. Likewise, lower distance denominator, upper slope numerator, and upper offset numerator are calculated in blocks 428, 430, and 432, respectively. Based on the upper distance denominator, upper slope numerator, and upper offset numerator, block 434 calculates an upper speed slope and block 436 calculates an upper speed offset. Similarly, from the lower distance denominator, upper speed slope numerator, and upper offset numerator, block 438 calculates a lower slope and block 440 calculates a lower offset. Then, these values are used in block 444, 446 to calculate the final slope and offset values respectively. Further, corrections for ambient conditions (standard atmospheric pressure (STD-ATM) and temperature) are described in block 442. Finally, in block 448, the estimated manifold pressure is calculated based on the slope, offset, air charge, ambient correction, and volumetric efficiency correction.

Note that the engine controller 12 adjusts various parameters based on the estimated manifold pressure. For example, estimated manifold pressure is used to calculate an adjustment to the amount of fuel provided by fuel injector 28 for a given pulse width driver signal. In addition, estimated manifold pressure can be used to monitor available vacuum-to-vacuum actuators, such as a brake booster, or an exhaust gas recirculation valve. Further, in step 234, the routine adjusts the fuel injection based on the predicted air charge value.

This concludes the description of the invention. However, various modifications can be made to the above described system. For example, various other interpolation methods can be applied in place of, or in combination with, the inverse distance algorithm. Such methods include, for example, Gaussian and Epanechnikow kernals.

One aspect of the present invention can be described as a method for controlling an engine of a vehicle, the engine having a variable valve actuator. The method comprises: storing slope and offset parameters as a function of intake and exhaust valve timing, with said stored parameters stored at a default operating point, a stability limited point, a high performance point, and an intermediate point; calculating current slope and offset parameters based on actual engine speed and actual intake and exhaust valve timings using said stored slope and offset parameters; and estimating an engine state based on said current slope and offset parameters, and based on at least one engine operating condition.

As described above herein, in one example, the engine state is manifold pressure of the engine. In another example, the engine state is a cylinder air amount.

What is claimed is:

1. A method for controlling an engine of a vehicle, the engine having a variable valve actuator, the method comprising:

storing manifold pressure related parameters as a function of intake and exhaust valve timing at a subset of engine operating conditions, said subset including at least a default operating point, and a predetermined set of normal conditions, and an intermediate point away from normal operating conditions;

calculating current manifold pressure related parameters based on actual engine speed and actual intake and exhaust valve timings using said stored manifold pressure related parameters, wherein said manifold pressure related parameters are a slope and offset parameter, wherein said calculating current slope and offset parameters further comprises calculating current slope and offset parameters based on an inverse squared distance of said actual engine speed and actual intake and exhaust valve timings to each of said default operating point, said normal conditions, high performance point, and intermediate point;

estimating an engine state based on said current manifold pressure related parameters, and based on at least one engine operating condition;

controlling the engine based on said estimated engine state.

2. The method recited in claim 1 wherein said engine state is at least one of a manifold pressure and a cylinder air amount.

3. The method recited in claim 1 wherein said at least one operating condition is mass air flow.

4. A method for controlling an engine of a vehicle, the engine having a variable valve actuator, the method comprising:

storing manifold pressure related parameters as a function of intake and exhaust valve timing at a subset of engine operating conditions, said subset including at least a default operating point, and a predetermined set of normal conditions, and an intermediate point away from normal operating conditions;

calculating current manifold pressure related parameters based on actual engine speed and actual intake and exhaust valve timings using said stored manifold pressure related parameters;

wherein said calculating current manifold pressure related parameters further comprises calculating current slope and offset parameters based on an inverse distance of said actual engine speed and actual intake and exhaust valve timings to each of said default operating point, said normal conditions, a high performance point, and said intermediate point;

estimating an engine state based on said current manifold pressure related parameters, and based on at least one engine operating condition, wherein said engine state is at least one of a manifold pressure and a cylinder air amount; and controlling the engine based on said estimated engine state.

5. The method recited in claim 4 wherein said high performance point is a maximum power point.

6. A method for controlling an engine of a vehicle, the engine having a variable valve actuator, the method comprising:

storing slope and offset parameters as a function of intake and exhaust valve timing, with said stored parameters stored at a default operating point, a stability limited point, a high performance point, and an intermediate point;

calculating current slope and offset parameters based on actual engine speed and actual intake and exhaust valve timings using said stored slope and offset parameters, wherein said calculating current slope and offset parameters further comprises calculating current slope and offset parameters based on an inverse squared distance of said actual engine speed and actual intake and exhaust valve timings to each of said default operating point, stability limited point, high performance point, and intermediate point; and estimating a cylinder air amount based on said current slope and offset parameters, and based on at least one engine operating condition.

7. The method recited in claim 6 wherein said at least one operating condition is mass air flow.

8. The method recited in claim 6 wherein said at least one operating condition is temperature.

9. The method recited in claim 6 further comprising adjusting a fuel injection amount based on said estimated cylinder air amount.

10. A method for controlling an engine of a vehicle, the engine having a variable valve actuator, the method comprising:

storing slope and offset parameters as a function of intake and exhaust valve timing, with said stored parameters stored at a default operating point, a stability limited point, a high performance point, and an intermediate point;

calculating current slope and offset parameters based on actual engine speed and actual intake and exhaust valve timings using said stored slope and offset parameters, wherein said calculating current slope and offset parameters further comprises calculating current slope and offset parameters based on an inverse distance of said actual engine speed and actual intake and exhaust valve timings to each of said default operating point, stability limited point, high performance point, and intermediate point; and estimating a cylinder air amount based on said current slope and offset parameters, and based on at least one engine operating condition, wherein said at least one operating condition is mass air flow.

11. The method recited in claim 10 wherein said high performance point is a maximum power point.

12. An article of manufacture, comprising:

a computer storage medium having a computer program encoded therein for controlling an engine of a vehicle, the engine having a variable valve actuator, the medium comprising:

code for storing slope and offset parameters as a function of intake and exhaust valve timing, with said stored parameters stored at a default operating point, a stability limited point, a high performance point, and an intermediate point;

code for calculating current slope and offset parameters based on an comparison of said actual engine speed and actual intake and exhaust valve timings to each of said default operating point, stability limited point, high performance point, and intermediate point, and code for estimating manifold pressure based on said current slope and offset parameters, and based on at least one engine operating condition.

13. The article recited in claim 12 wherein said code for calculating further comprises code for calculating current slope and offset parameters further comprises calculating current slope and offset parameters based on an inverse distance of said actual engine speed and actual intake and exhaust valve timings to each of said default operating point, stability limited point, high performance point, and intermediate point.

* * * * *